(12) United States Patent
Fischer et al.

(10) Patent No.: US 7,991,402 B2
(45) Date of Patent: Aug. 2, 2011

(54) MBMS DUAL RECEIVER

(75) Inventors: Patrick Fischer, Bourg la Reine (FR); Young Dae Lee, Hanam (KR); Sung Duck Chun, Seoul (KR); Myung Cheul Jung, Seoul (KR); Sung Jun Park, Gunpo (KR)

(73) Assignee: LG Electronics Inc., Seoul (KR)

( * ) Notice: Subject to any disclaimer, the term of this patent is extended or adjusted under 35 U.S.C. 154(b) by 476 days.

(21) Appl. No.: 11/671,980

(22) Filed: Feb. 6, 2007

(65) Prior Publication Data

US 2007/0191019 A1    Aug. 16, 2007

Related U.S. Application Data

(60) Provisional application No. 60/771,520, filed on Feb. 6, 2006, provisional application No. 60/797,402, filed on May 2, 2006, provisional application No. 60/797,459, filed on May 3, 2006.

(51) Int. Cl.
    *H04M 1/00*    (2006.01)
(52) U.S. Cl. ............... 455/452.2; 455/552.1; 455/553.1; 455/436; 370/328
(58) Field of Classification Search ............... 455/452.2, 455/552.1, 553.1, 328, 550.1, 41.2–41.3, 455/434, 435.2, 436–444; 370/328, 395.2, 370/395.21, 352, 343, 338, 331–334
See application file for complete search history.

(56) References Cited

U.S. PATENT DOCUMENTS

| | | | |
|---|---|---|---|
| 7,313,414 B2 * | 12/2007 | van Rooyen | 455/553.1 |
| 7,626,960 B2 | 12/2009 | Muller | |
| 2001/0036830 A1 | 11/2001 | Wu et al. | |
| 2004/0151133 A1 | 8/2004 | Yi et al. | |

(Continued)

FOREIGN PATENT DOCUMENTS

EP    1478198    11/2004

(Continued)

OTHER PUBLICATIONS

3rd Generation Partnership Project (3GPP) Organizational Partners, "Improvement of the Multimedia Broadcast Multicast Service (MBMS) in UTRAN (Release 7)," Technical Specification Group Radio Access Network, 3GPP TR 25.905, Version 7.0.0., Dec. 2006.

(Continued)

*Primary Examiner* — Jinsong Hu
*Assistant Examiner* — Qun Shen
(74) *Attorney, Agent, or Firm* — Lee, Hong, Degerman, Kang & Waimey

(57) ABSTRACT

A method for communicating between a network and a dual receiver UE includes receiving first signaling from a first network node at a first frequency, and receiving second signaling via a PtM control channel from a second network node at a second frequency. The method further includes receiving a request from the second network node at the second frequency, such that the request is carried on the PtM control channel, and transmitting to the first network node a response to the request from the second network node. An alternative method includes receiving communications from a first network node, and identifying that the first network node lacks uplink capabilities. This method may further include identifying that the first network node provides a MBMS service, and receiving the MBMS service from the first network node despite the identification of the lack of uplink capabilities.

22 Claims, 15 Drawing Sheets

U.S. PATENT DOCUMENTS

| | | | |
|---|---|---|---|
| 2004/0224698 A1 | 11/2004 | Yi et al. | |
| 2005/0025164 A1 | 2/2005 | Kavanagh et al. | |
| 2005/0070277 A1* | 3/2005 | Hu | 455/432.3 |
| 2005/0075124 A1 | 4/2005 | Willenegger et al. | |
| 2005/0111393 A1* | 5/2005 | Jeong et al. | 370/312 |
| 2005/0138528 A1 | 6/2005 | Ameigeiras et al. | |
| 2005/0147127 A1* | 7/2005 | Putcha et al. | 370/480 |
| 2005/0213575 A1 | 9/2005 | Shin et al. | |
| 2006/0030342 A1 | 2/2006 | Hwang et al. | |
| 2006/0058047 A1* | 3/2006 | Jeong et al. | 455/464 |
| 2006/0098567 A1* | 5/2006 | Willenegger et al. | 370/206 |
| 2006/0128427 A1 | 6/2006 | van Rooyen | |
| 2006/0140148 A1* | 6/2006 | Kwak et al. | 370/329 |
| 2007/0136132 A1 | 6/2007 | Weiser et al. | |
| 2007/0206530 A1* | 9/2007 | Lee et al. | 370/329 |
| 2008/0031245 A1* | 2/2008 | Pekonen | 370/390 |

FOREIGN PATENT DOCUMENTS

| | | |
|---|---|---|
| JP | 2004-135346 | 4/2004 |
| JP | 2005-117655 | 4/2005 |
| JP | 2005-518704 | 6/2005 |
| JP | 2005-252506 | 9/2005 |
| JP | 2007-522758 | 8/2007 |
| TW | 2007-26280 | 7/2007 |
| WO | 01/17296 | 3/2001 |
| WO | 02/076127 | 9/2002 |
| WO | 2004/038995 | 5/2004 |
| WO | 2005/006596 | 1/2005 |
| WO | 2005/067492 | 7/2005 |

OTHER PUBLICATIONS

Lg Electronics, "MBMS Dual Receiver," 3GPP TSG RAN WG2 Meeting #51, R2-060582, Feb. 13, 2006.

LG Electronics, "Dual Receiver for MBMS," 3GPP TSG RAN WG2#53, R2-061303, May 8, 2006.

\* cited by examiner

Logical channels mapped onto transport channels, seen from the UE side
PRIOR ART Logical channels mapped onto transport channels, seen from the UTRAN side
PRIOR ART UE State Transitions
PRIOR ART

MBMS DUAL RECEIVER

CROSS-REFERENCE TO RELATED APPLICATIONS

Pursuant to 35 U.S.C. §119(e), this application claims benefit of priority from provisional patent applications Ser. No. 60/771,520, filed Feb. 6, 2006, Ser. No. 60/797,402, filed May 2, 2006, and Ser. No. 60/797,459, filed May 3, 2006, the contents of which are hereby incorporated by reference herein in their entirety.

BACKGROUND OF THE INVENTION

1. Field of the Invention

The present invention relates generally to wireless communication systems, and in particular to communications between a network and dual receiver user equipment (UE).

2. Discussion of the Related Art

A universal mobile telecommunication system (UMTS) is a European-type, third generation IMT-2000 mobile communication system that has evolved from a European standard known as global system for mobile communications (GSM). UMTS is intended to provide an improved mobile communication service based upon a GSM core network and wideband code division multiple access (W-CDMA) wireless connection technology.

In December 1998, a Third Generation Partnership Project (3GPP) was formed by the ETSI of Europe, the ARIB/TTC of Japan, the Ti of the United States, and the TTA of Korea. The 3GPP creates detailed specifications of UMTS technology. In order to achieve rapid and efficient technical development of the UMTS, five technical specification groups (TSG) have been created within the 3 GPP for standardizing the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 gives an overview of the UMTS network, including the UE, the UTRAN and the core network. The UTRAN is composed of several radio network controllers (RNCs) and Node-Bs, which communicate via the Iub interface.

Each RNC controls several Node-Bs. Each RNC is connected via the Iu interface to the core network (CN), specifically to the MSC (mobile-services switching center) and the SGSN (serving GPRS support node) of the CN. RNCs can be connected to other RNCs via the Iur interface. The RNC handles the assignment and management of radio resources and operates as an access point with respect to the core network.

The Node-Bs receive information sent by the physical layer of the terminal through an uplink transmission and transmit data to the terminal through a downlink transmission. The Node-Bs operate as access points of the UTRAN for the terminal.

The SGSN is connected via the Gf interface to the EIR (equipment identity register), via the GS interface to the MSC, via the GN interface to the GGSN (gateway GPRS support node) and via the GR interface to the HSS (home subscriber server). The EIR maintains lists of mobiles that are allowed to be used on the network.

The MSC, which controls the connection for circuit switch (CS) services. The MSC is connected to the MGW (media gateway) via the NB interface, to the EIR via the F interface, and to the HSS via the D interface. The MGW is connected to the HSS via the C interface and to the PSTN (Public Switched Telephone Network). The MGW facilitates adapting the codecs between the PSTN and the connected RAN.

The GGSN is connected to the HSS via the GC interface, and to the Internet via the GI interface. The GGSN is responsible for routing, charging, and separation of data flows into different radio access bearers (RABs). The HSS handles the subscription data of the users.

The UTRAN constructs and maintains a radio access bearer (RAB) for communication between the terminal and the core network. The core network requests end-to-end quality of service (QoS) requirements from the RAB, and the RAB supports the QoS requirements set by the core network. Accordingly, the UTRAN can satisfy the end-to-end QoS requirements by constructing and maintaining the RAB.

The services provided to a specific terminal are roughly divided into circuit switched services and packet switched services. For example, a general voice conversation service is a circuit switched service, while a Web browsing service via an Internet connection is classified as a packet switched service.

For supporting circuit switched services, the RNCs are connected to the mobile switching center (MSC) of the core network, and the MSC is connected to the gateway mobile switching center (GMSC) which manages the connection with other networks. For supporting packet switched services, the RNCs are connected to the serving general packet radio service (GPRS) support node (SGSN), and the gateway GPRS support node (GGSN) of the core network. The SGSN supports the packet communications with the RNCs, and the GGSN manages the connection with other packet switched networks, such as the Internet.

FIG. 2 illustrates a structure of a radio interface protocol between the terminal and the UTRAN according to the 3GPP radio access network standards. As shown in FIG. 2, the radio interface protocol has vertical layers comprising a physical layer, a data link layer, and a network layer, and has horizontal planes comprising a user plane (U-plane) for transmitting user data and a control plane (C-plane) for transmitting control information.

The user plane is a region that handles traffic information with the user, such as voice or Internet protocol (IP) packets. The control plane is a region that handles control information for an interface with a network, maintenance and management of a call, and the like.

The protocol layers in FIG. 2 can be divided into a first layer (L1), a second layer (L2), and a third layer (L3) based on the three lower layers of an open system interconnection (OSI) standard model. The first layer (L1), or the physical layer, provides an information transfer service to an upper layer by using various radio transmission techniques. The physical layer is connected to an upper layer, called a medium access control (MAC) layer, via a transport channel.

The MAC layer and the physical layer exchange data via the transport channel. The second layer (L2) includes a MAC layer, a radio link control (RLC) layer, a broadcast/multicast control (BMC) layer, and a packet data convergence protocol (PDCP) layer.

The MAC layer handles mapping between logical channels and transport channels, and provides allocation of the MAC parameters for allocation and re-allocation of radio resources. The MAC layer is connected to an upper layer, called the radio link control (RLC) layer, via a logical channel.

Various logical channels are provided according to the type of information transmitted. In general, a control channel is used to transmit information of the control plane, and a traffic channel is used to transmit information of the user plane.

A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast-control channel (BCCH), and a paging control channel (PCCH) or a shared channel control channel.

The BCCH provides information including information utilized by a terminal to access a system. The PCCH is used by the UTRAN to access a terminal.

For the purposes of a multimedia broadcast/multicast service (MBMS) additional traffic and control channels are introduced in the MBMS standard. The MCCH (MBMS point-to-multipoint control channel) is used for transmission of MBMS control information. The MTCH (MBMS point-to-multipoint traffic channel) is used for transmitting MBMS service data. The MSCH (MBMS Scheduling Channel) is used to transmit scheduling information. The different logical channels that exist are listed in FIG. 3.

The MAC layer is connected to the physical layer by transport channels and can be divided into a MAC-b sub-layer, a MAC-d sub-layer, a MAC-c/sh sub-layer, a MAC-hs sub-layer and a MAC-m sublayer according to the type of transport channel being managed. The MAC-b sub-layer manages a BCH (broadcast channel), which is a transport channel handling the broadcasting of system information. The MAC-c/sh sub-layer manages a common transport channel, such as a forward access channel (FACH) or a downlink shared channel (DSCH), which is shared by a plurality of terminals, or in the uplink the radio access channel (RACH). The MAC-m sublayer may handle the MBMS data.

The possible mapping between the logical channels and the transport channels from a UE perspective is given in FIG. 4. The possible mapping between the logical channels and the transport channels from a UTRAN perspective is given in FIG. 5.

The MAC-d sub-layer manages a dedicated channel (DCH), which is a dedicated transport channel for a specific terminal. The MAC-d sublayer is located in a serving RNC (SRNC) that manages a corresponding terminal. One MAC-d sublayer also exists in each terminal.

The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto. The data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as the IPv4 or IPv6, effectively on a radio interface with a relatively small bandwidth. For this purpose, the PDCP layer reduces unnecessary control information used in a wired network, a function called header compression.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). Additionally the RRC handles user mobility within the RAN and additional services, such as location services.

The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods.

The different possibilities that exist for the mapping between the radio bearers and the transport channels for a given UE are not all possible all the time. The UE and UTRAN deduce the possible mapping depending on the UE state and the procedure that the UE and UTRAN are executing. The different states and modes are explained in more detail below, as far as they concern the present invention.

The different transport channels are mapped onto different physical channels. For example, the RACH transport channel is mapped on a given PRACH, the DCH can be mapped on the DPCH, the FACH and the PCH can be mapped on the S-CCPCH, and the DSCH is mapped on the PDSCH. The configuration of the physical channels is given by RRC signaling exchange between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode.

Because an RRC connection exists for terminals in RRC connected mode, the UTRAN can determine the existence of a particular terminal within the unit of cells. For example, the UTRAN can determine in which cell or set of cells an RRC connected mode terminal is located and to which physical channel the UE is listening. Thus, the terminal can be effectively controlled.

In contrast, the UTRAN cannot determine the existence of a terminal in idle mode. The existence of idle mode terminals can only be determined by the core network to be within a region that is larger than a cell, for example, a location or a routing area. Therefore, the existence of idle mode terminals is determined within large regions, and in order to receive mobile communication services such as voice or data, the idle mode terminal must move or change into the RRC connected mode. The possible transitions between modes and states are shown in FIG. 6.

A UE in RRC connected mode can be in different states, such as CELL_FACH state, CELL_PCH state, CELL_DCH state, or URA_PCH state. Depending on the state, the UE carries out different actions and listens to different channels.

For example, a UE in CELL_DCH state will try to listen to DCH type of transport channels, among others. DCH types of transport channels include DTCH and DCCH transport channels, which can be mapped to a certain DPCH, DPDSCH or other physical channels.

The UE in CELL_FACH state will listen to several FACH transport channels, which are mapped to a certain S-CCPCH. A UE in PCH state will listen to the PICH channel and the PCH channel, which are mapped to a certain S-CCPCH physical channel.

The main system information is sent on the BCCH logical channel which is mapped on the P-CCPCH (primary common control physical channel). Specific system information blocks can be sent on the FACH channel. When the system information is sent on FACH, the UE receives the configuration of the FACH either on the BCCH that is received on P-CCPCH or on a dedicated channel. When system information is sent on the BCCH (i.e., via the P-CCPCH), then in each frame or set of two frames the SFN (system frame number) is sent which is used in order to share the same timing reference between the UE and the Node-B. The P-CCPCH is sent using the same scrambling code as the P-CPICH (primary common pilot channel), which is the primary scrambling code of the cell. The spreading code that is used by the P-CCPCH is of a fixed SF (spreading factor) 256, and the number is one. The UE knows about the primary scrambling code either by information sent from the network on system information of neighboring cells that the UE has read, by messages that the UE has received on the DCCH channel, or by searching for the P-CPICH, which is sent using the fixed SF 256, the spreading code number 0 and which ransmits a fixed pattern.

The system information comprises information on neighboring cells, configuration of the RACH and FACH transport channels, and the configuration of MICH and MCCH which are channels that are dedicated channels for the MBMS service.

Each time the LE changes the cell it is camping (in idle mode) or when the UE has selected the cell (in CELL_FACH, CELL_PCH or URA_PCH) state, the UE verifies that it has valid system information. The system information is organized in SIBs (system information blocks), a MIB (master information block) and scheduling blocks. The MIB is sent very frequently and gives timing information of the scheduling blocks and the different SIBs. For SIBs that are linked to a value tag, the MIB also contains information on the last version of a part of the SIBs. SIBs that are not linked to a value tag are linked to an expiration timer. SIBs linked to an expiration timer become invalid and need to be reread if the time of the last reading of the SIB is larger than this timer value. SIBs linked to a value tag are only valid if they have the same value tag as the one broadcast in the MIB. Each block has an area scope of validity (cell, PLMN, equivalent PLMN) which signifies on which cells the SIB is valid. A SIB with area scope "cell" is valid only for the cell in which it has been read. A SIB with area scope "PLMN" is valid in the whole PLMN, a SIB with the area scope "equivalent PLMN" is valid in the whole PLMN and equivalent PLMN.

In general UEs read the system information when they are in idle mode, CELL_FACH state, CELL_PCH state or in URA_PCH state of the cells that they have selected or the cell that they are camping on. In the system information, they receive information on neighboring cells on the same frequency, different frequencies and different RAT (radio access technologies). This allows the UE to know which cells are candidates for cell reselection.

MBMS is introduced in the UMTS standard in the Release 6 of the specification (Rel-6). It describes techniques for optimized transmission of MBMS bearer service including point-to-multipoint transmission, selective combining and transmission mode selection between point-to-multipoint and point-to-point bearers. This is used in order to save radio resources when the same content is sent to multiple users, and enables TV-like services. MBMS data can be split into two categories, control plane information and user plane information. The control plane information contains information on the physical layer configuration, transport channel configuration, radio bearer configuration, ongoing services, counting information, scheduling information, and the like. In order to allow UEs to receive this information, MBMS bearer specific control information for the MBMS is sent to the UEs.

The user plane data of MBMS bearers can be mapped onto dedicated transport channels for a point-to-point service which is sent only to one UE, or on a shared transport channel for point to multipoint service which is transmitted to (and received by) several users at the same time.

Point-to-point transmission is used to transfer MBMS specific control/user plane information, as well as dedicated control/user plane information between the network and a UE in RRC connected mode. It is used for the multicast or the broadcast mode of MBMS. DTCH is used for a UE in CELL_FACH and Cell_DCH. This allows existing mappings to transport channels.

To allow cell resources to be used in an optimized manner, a function called counting has been introduced in MBMS applications. The counting procedure is used to determine how many UEs are interested in the reception of a given service. This is done by using the counting procedure shown in FIG. 7.

For example, a UE that is interested in a certain service receives information of the availability of a MBMS service. The network can inform the UE that it should indicate to the network its interest in the service in the same way such as by transmitting the "access information" on the MCCH channel. A probability factor included in the access information message determines that an interested UE will only respond with a given probability. In order to inform the network that the UE is interested in a given service, the UE will send to the network the RRC connection setup message or the cell update message in the cell that the UE has received the counting information. This message may potentially include an identifier indicating the service that the UE is interested in.

Point-to-multipoint transmission is used to transfer MBMS specific control/user plane information between the network and several UEs in RRC connected or idle mode. It is used for broadcast or multicast mode of MBMS.

In the case that the network operates on several frequencies, when a UE is camping on one frequency, and a MBMS service is transmitted on a different frequency, a UE may not be aware of the fact that a MBMS service is transmitted in the different frequency. Therefore the frequency convergence procedure allows the UE to receive information in frequency A that indicates in a frequency B that a given service is available.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for communicating between a network and a dual receiver UE includes receiving first signaling from a first network node at a first frequency, and receiving second signaling via a PtM control channel from a second network node at a second frequency. The method further includes receiving a request from the second network node at the second frequency, such that the request is carried on the PtM control channel, and transmitting to the first network node a response to the request from the second network node.

In one aspect, the method further includes receiving a list of at least one different network node which transmits at the second frequency and which provides cell coverage which overlaps at least a portion of cell coverage provided by the first network node.

In another aspect, the method further includes receiving at least one identity from the first network node such that the at least one identity identifies the second network node.

In yet another aspect, the method her includes receiving transmission permission from either of the second network node or the first network node such that the transmission permission causes the transmitting of the response to the first network node.

In still yet another aspect, the transmission permission is received from the second network node and comprises a list of network nodes on which the response can be transmitted to.

In one feature, the transmission permission is received from the first network node and comprises a list of network nodes from which the request has been received.

In another feature, the method further includes receiving a frequency conversion message from the first network node such that the message allows the UE to attempt to reselect a third network node transmitting on the second frequency. In this feature, the transmission permission causes the UE to disregard the message such that the UE does not perform the attempt to reselect.

In yet another feature, the response includes at least one of a service identifier which identifies a service associated with the UE, a frequency identifier which identifies the second frequency, and a cell identifier which identifies the second network node.

In still yet another feature, the response includes one of an RRC connection request and a cell update, or an MBMS modification request.

In one aspect, the request is a counting request or a point-to-point establishment request.

In another aspect, the PtM control channel is a MBMS point-to-multipoint control channel.

According to another aspect, the receiving of the first signaling and the second signaling occurs substantially simultaneously.

According to yet another aspect, the first network node and the second network node are implemented in a single base station or they are separately implemented in distinct base stations.

In accordance with an alternative embodiment, a method for communicating between a network and a dual receiver UE includes communicating first signaling from a first network node at a first frequency, and communicating second signaling via a PtM control channel from a second network node at a second frequency. This method further includes communicating a request from the second network node at the second frequency, such that the request is carried on the PtM control channel, and receiving at the first network node a response to the request from the second network node.

In accordance with another alternative embodiment, a method for communicating between a network and a UE includes receiving communications from a first network node, and identifying that the first network node lacks uplink capabilities. The method may further include identifying that the first network node provides a MBMS service, and receiving the MBMS service from the first network node despite the identification of the lack of uplink capabilities.

In accordance with yet another alternative embodiment a method for communicating between a network and a UE includes providing a MBMS service from a first network node, and indicating that the first network node lacks uplink capabilities. The method may further include indicating that the UE is permitted to receive the MBMS service despite the indication of the lack of uplink capabilities of the first network node.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings.

DETAILED DESCRIPTION OF THE PREFERRED EMBODIMENTS

Figure 1:
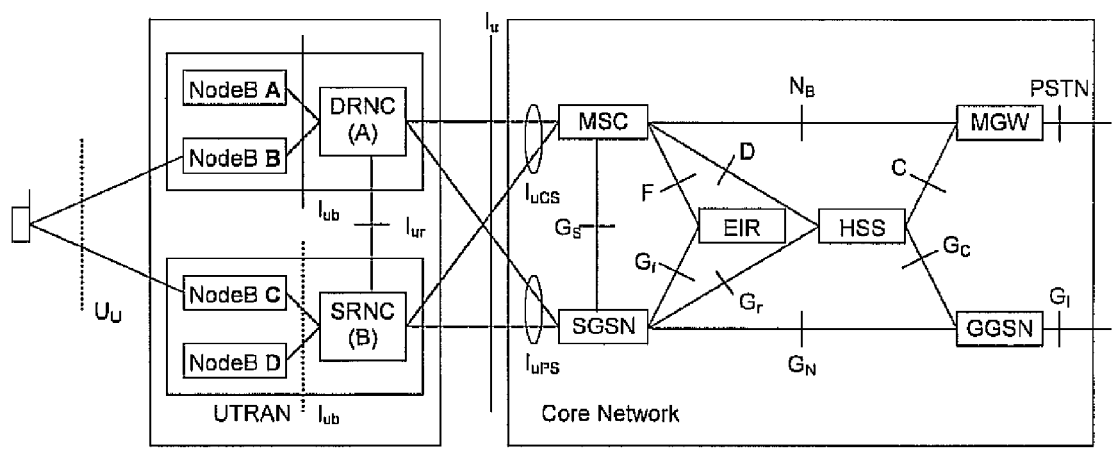
FIG. 1 illustrates a conventional UMTS network.
Figure 2:
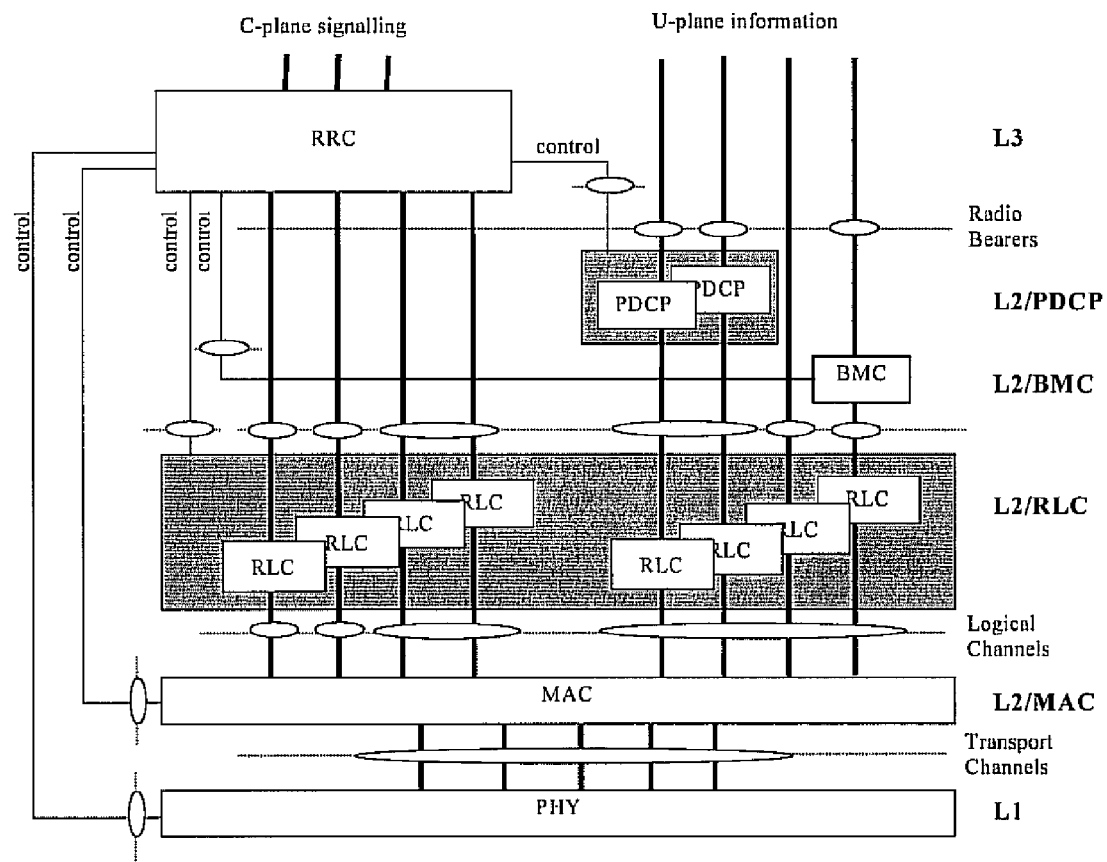
FIG. 2 illustrates a conventional radio interface protocol between a UE and UTRAN.
Figure 3:
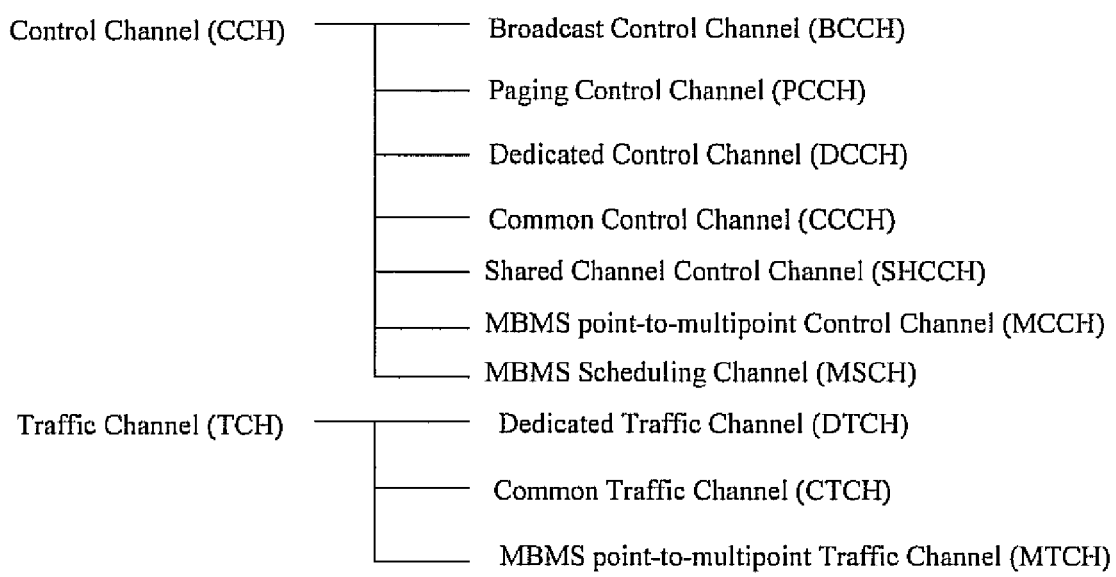
FIG. 3 illustrates logical channel structure.
Figure 4:
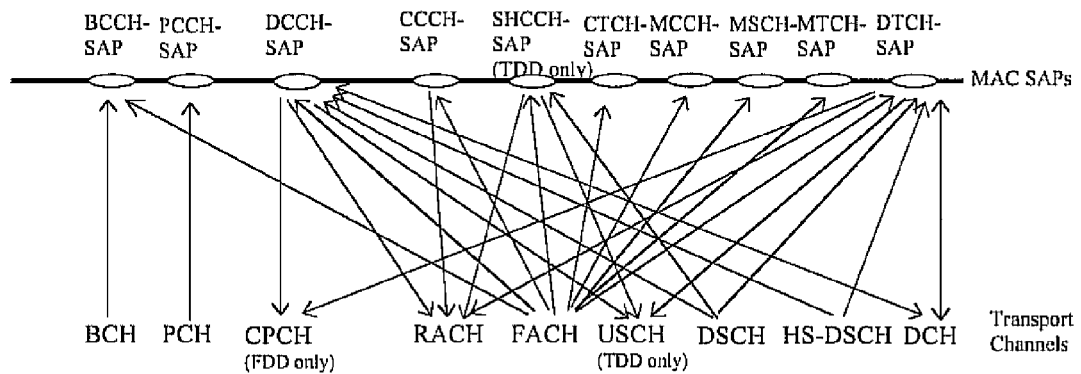
FIG. 4 illustrates possible mappings between logical channels and transport channels from the UE perspective.
Figure 5:
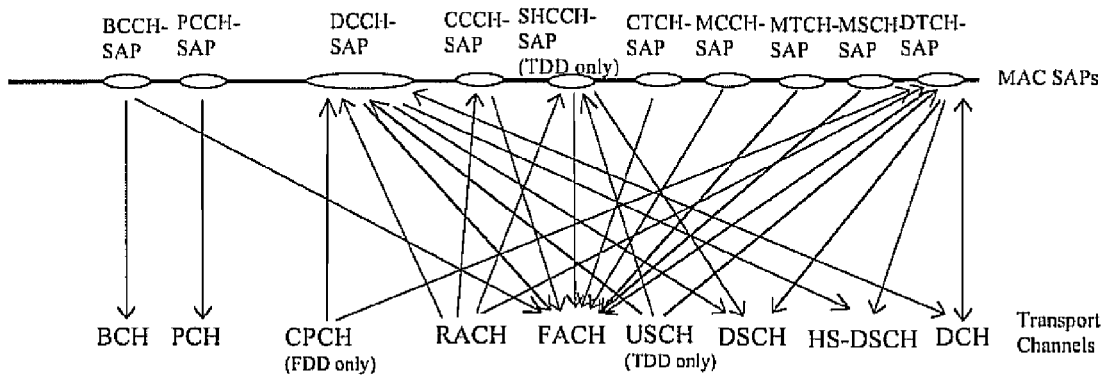
FIG. 5 illustrates possible mappings between logical channels and transport channels from the UTRAN perspective.
Figure 6:
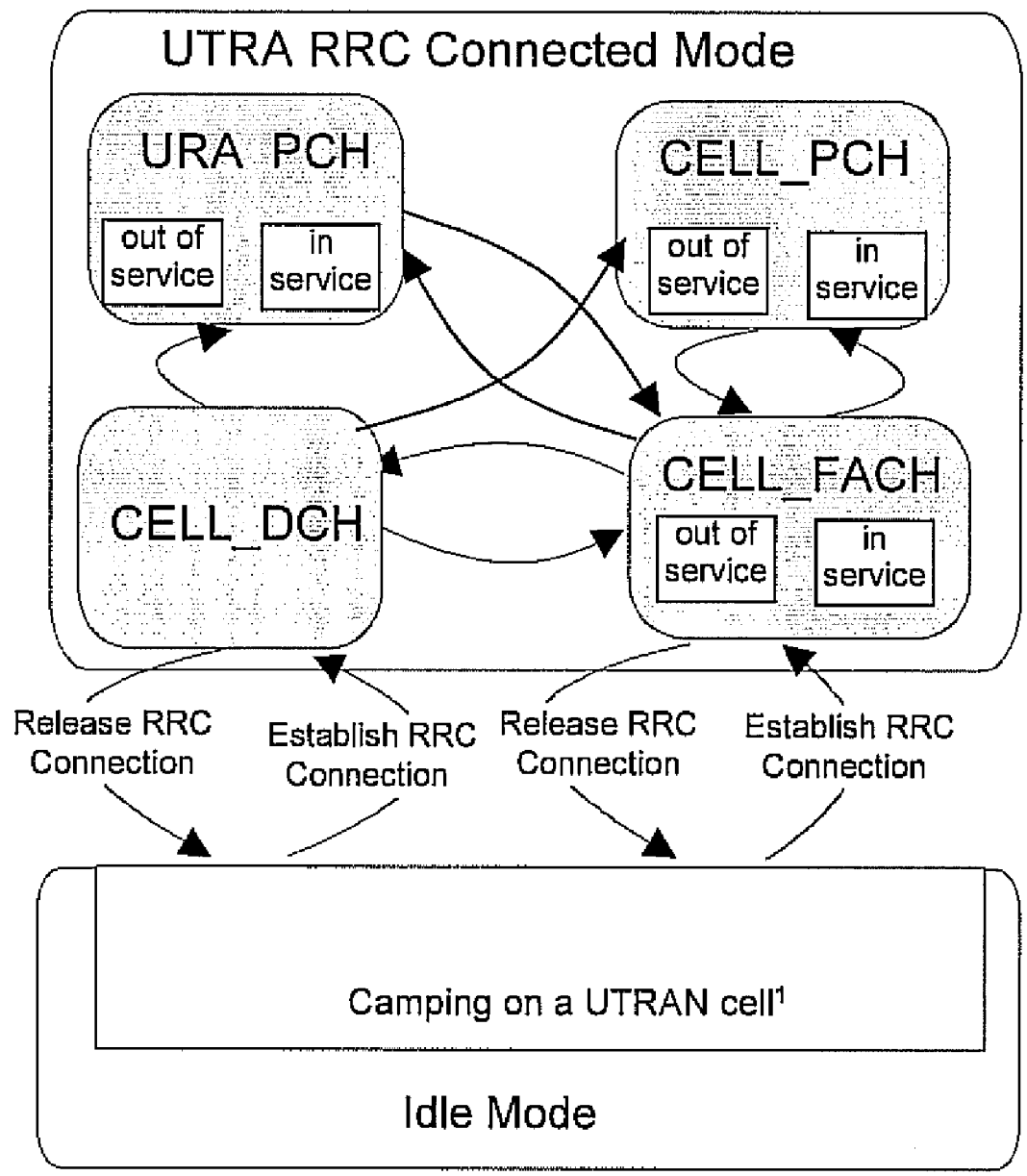
FIG. 6 illustrates possible LE state transitions.
Figure 7:
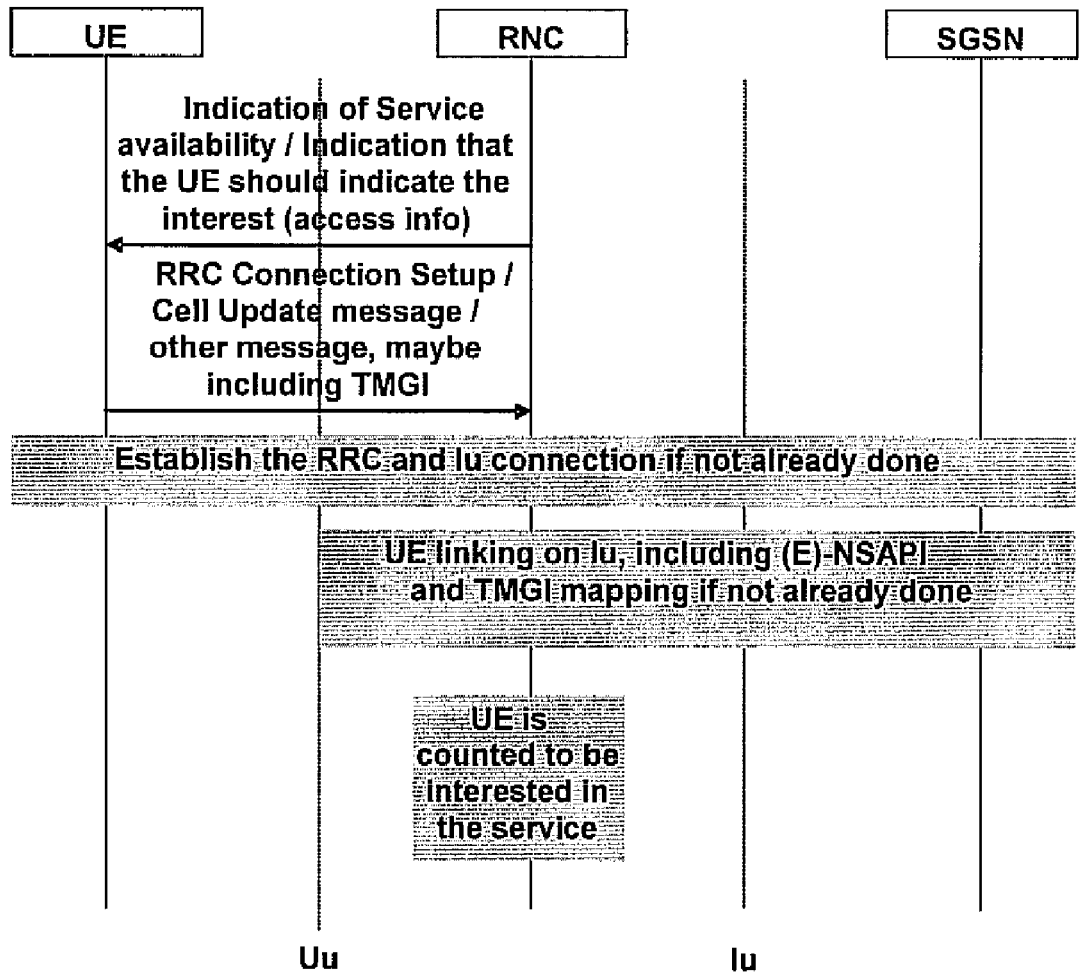
FIG. 7 illustrates a typical counting procedure.

Reference will now be made in detail to the preferred embodiments of the present invention, examples of which are illustrated in the accompanying drawings. Wherever possible, the same reference numbers will be used throughout the drawings to refer to the same or similar parts.

Various embodiments of the invention include methods for simultaneous reception of a MBMS service and a dedicated service on two different frequencies. Specific embodiments include matters such as counting, PtP establishment, and frequency convergence.

With regard to the frequency division duplex (FDD) case, adding a second receiver to the UE which would be dedicated to MBMS has several advantages and provides freedom to the network. Such dual receiver UEs provide several desirable options. For instance, the second receiver may be used to reduce the potential number of conflicts, or the adding of a frequency that would be dedicated to only MBMS and which could be received by this second receiver.

It is desirable for the network to have backward capabilities for use with UEs which do not have dual receivers. In order to ensure backwards capability, the network may be provided with specific functionality to address these concerns. For instance, the network may indicate via dedicated or common control signaling whether or not specific UE behavior for dual receiver UEs is allowed. One technique is to set MBMS default behavior such that the UE does not use the second receiver (FDD or TDD) for the reception of MBMS.

One technique to avoid non-Rel. 7 UEs (e.g., UEs which do not have dual receivers) from camping on the dedicated MBMS frequency is to "hide the frequency" from such UEs. Using this technique, the cells associated with this dedicated MBMS frequency would not be included in the neighboring cell list of frequencies which is available to all UEs. In particular, the additional cell or frequency associated with MBMS could alternatively be provided via the BCCH/MCCH, for example, using a specific extension such that only dual receiver UEs could listen to this dedicated frequency.

Another concern is that single receiver UEs will detect the MBMS frequency during a periodic frequency scan. One method for solving this concern is to not broadcast on the frequency one or more of the following SIBs: 1, 3, 5 5 bis, or 7 (SIB 13 for TDD cases).

This approach allows the UE to respond to counting on the frequency/cell it is camping on regardless of the cell associated with broadcasting the MBMS service. Moreover, specific handling may be implemented to allow the RNC to correlate the counting response/PtP establishment for dual receiver UEs using, for example, an appropriate service identifier.

Another technique for optimizing the MBMS service is to use the TDD spectrum for the transmission of MBMS, and the FDD spectrum for dedicated services. In this scenario, it may be beneficial for not including uplink capabilities in the TDD case so that the UE need only have receiving capabilities; transmission capabilities therefore are not necessary.

Current solutions do not provide MBMS services transmitted on the TDD spectrum in the FDD spectrum, and vice versa. These types of interactions do not currently exist in Rel-6 networks, potentially resulting in interoperability issues with regard to TDD only UEs. Similarly to the case of a hidden FDD frequency, such issues may be resolved by not transmitting SIB 13 in the TDD cells that do not support uplink operation. In this scenario, it may be desirable that the MICH would only be broadcast in one frequency (e.g., the FDD frequency where the UE is camping for regular service), and that at session start the UE also starts the TDD receiver. One possibility is to use a service that would indicate that the UE should start to receive the TDD frequency, or a specific extension on the MCCH messages that may be used to signal that a given service is only available on the associated TDD frequency/cell.

A dual receiver UE is typically capable of simultaneously receiving dedicated services and MBMS PtP/PtM services on one frequency (frequency A), as well as MBMS services sent on PtM bearers on a separate frequency (frequency B). Examples for providing this are as follows.

Frequency A may be characterized as FDD or TDD (dedicated services and MBMS), and is a frequency on which the UE is camping on for reception of such dedicated services. This frequency may include channels independent from the MBMS; MICH or MCCH independent from the MBMS services on frequency B; and MTCH (possibly depending on the reception of MBMS services with the dual receiver).

Frequency B may be characterized as FDD or TDD (additional MBMS capabilities). This frequency may include BCCH; MICH or MCCH independent from the reception of MBMS services or dedicated services on frequency A; and MTCH (possibly depending on the reception of MBMS services on frequency A with the dual receiver).

In accordance with embodiments of the present invention, dual receiver UEs are useful in a number of different scenarios. For example, in a MBMS multicarrier Rel-6 network: Rel-6 frequency convergence and counting may be used for transmission in only one frequency; and Rel-7 rules for dual receiver UEs without network impact may be used to allow the UE to receive dedicated and MBMS services with no restriction.

In another example, in a MBMS multicarrier Rel-6 network which includes optimizations for a Rel-7 dual receiver UE: Rel-6 frequency convergence and counting may be used for transmission in only one frequency; Rel-7 rules may be implemented for dual receiver UEs without network impact to allow the receiving of dedicated and MBMS services with no restriction; and Rel-7 mechanisms for dual receiver UEs may be used to allow resource optimization to receive dedicated and MBMS services with no restriction.

In yet another example, in a Rel-6 network (either single carrier or multicarrier) with a separate independent MBMS downlink only frequency for Rel-7 dual receiver UEs (DD/TDD), mechanisms for paging on the Rel-6 network may be used to activate the dual receiver for reception of MBMS services.

Figure 8:
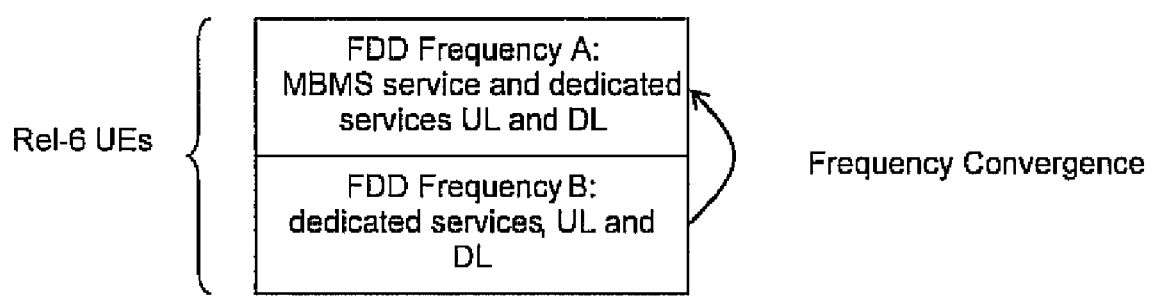
FIG. 8 illustrates a FDD MBMS multicarrier network in Rel-6 with Rel-7 dual receiver UEs.

It is useful to define the behavior of a typical dual receiver UE in a Rel-6 MBMS network which includes two frequency layers. An example of this is shown in FIG. 8. In this scenario an operator has deployed a multicarrier network with more than one 5 MHz frequency, for example. Counting, PtP establishment, and frequency convergence will now be addressed.

With regard to counting, current solutions do not provide how a UE camping on frequency B, and which receives MTCH and MCCHs on a separate frequency A, would behave if counting is started or if the RNC indicates that the service is sent on a PtP bearer. Several solutions to these issues are possible and are contemplated by the present disclosure.

For example, the UE may respond with an RRC request/URA update/cell update on the frequency that it is camping on. These actions assume that the network is configured to correlate the UE response with the signaling sent on a different cell/frequency. Therefore it is useful for the network to control whether or not this functionality is allowed.

Another example includes the UE responding with an RRC request/URA update/cell update on the frequency at which it has received the counting information, or by indicating that a service is sent on a PtP bearer. This scenario may require the UE to perform cell reselection. It would therefore be useful to determine when the UE is allowed to perform this cell reselection.

One technique for realizing this feature is to reuse the specific offsets for frequency convergence (i.e., the UE initiates the RRC request/URA update/cell update on the frequency that it receives using the additional receiver in the case that the conditions for frequency convergence would be fulfilled). Another possibility is to add a specific parameter to the MCCH, or via dedicated signaling in order to allow the cell reselection.

Yet another example relates to the situation in which the UE does not respond to counting/PtP establishment on a frequency where it is not camping, but it continues to receive MTCH. This behavior is similar to the situation in which the UE does not have dual receiver capabilities. Such a scenario does not usually create any problems, and thus may be considered the default behavior for dual receiver UEs, unless the network signals specific indications to otherwise operate.

Concerning PtP establishment, current solutions include the UE initiating an RRC connection setup/cell update message in order to respond to a PtP bearer establishment request. In these scenarios, there is no indication of the related services so a Rel-6 network would typically not expect a request for a MBMS PtP bearer on which it has not initiated a PtP bearer establishment. Therefore a dual receiver UE in such a situation would only respond to the PtP bearer establishment indication on the corresponding uplink frequency at which the PtP bearer establishment is indicated in the MCCH. On this subject, the RRC connection request/cell update as an answer to the PtP bearer establishment may be arranged such that it could only be performed on the corresponding uplink frequency where the MCCH is sent in the downlink. That is, the UE may be configured to respond only if it is camping on the uplink frequency corresponding to the MCCH on which the PtP establishment indication has been sent.

With regard to frequency convergence, current solutions do not adequately address whether or not a dual receiver UE is to perform frequency convergence. In particular, such solutions do not consider the possibility that a UE supports a separate receiver for MBMS, and only indicate that the UE is to listen to the MTCH/MCCH/MSCH of the frequency/cell that it is camped on.

A dual receiver UE should stay on the frequency it has selected if it is able to receive the preferred frequency via its dual receiver. This may be accomplished by the dual receiver UE not applying frequency convergence as long as it is able to receive the services that it has subscribed. Alternatively, the network may control whether or not the UEs are to use their additional receiver capabilities, or rather apply frequency convergence.

Frequency convergence is currently performed in order to allow UEs that are camping on a frequency on which a MBMS service is not broadcasted to select to the frequency on which the service is broadcast. A dual receiver UE in accordance with embodiments of the present invention is not required to select to the frequency of the MBMS service when the service is sent on a PtM bearer. However, it is understood that the network could perform recounting, or switch to the PtP bearer at any time. In these cases, the UE may answer on the same frequency as the frequency on which it has received the indication. Accordingly, the UE may be configured to only reselect to the preferred frequency on which counting or PtP establishment is required to be performed. Alternatively, the dual receiver UE may follow the Rel-6 requirements as if the UE does not have dual receiver capabilities, including prioritization.

Another alternative is that the UE would not follow frequency convergence unless it is incapable of receiving a prioritized service. In that case the UE could either perform frequency convergence in response to counting or PtP establishment, or it would not perform frequency convergence in the case that it should respond to counting or MBMS PtP establishment. Different behavior is also possible for the case of counting and MBMS PtP bearer establishment.

According to Rel-6 specifications, the UE is to indicate to the network if its preferred frequency is different from the frequency that is currently being used for dedicated services. However for a dual receiver UE, even if a prioritized service is sent on a different frequency on a PtM bearer, there does not appear to be any significant issues for the dual receiver UE, and indicating to the network the desire to change frequency could possibly have drawbacks. Therefore, the UE should not use the MBMS modification request message in situations in which it is capable of receiving all wanted services and the prioritized service is sent on a different frequency. As such, the dual receiver UE would not be required to indicate to the network the prioritized service/frequency, or RBs to be released, as long as the UE it is able to receive all prioritized services including via the dual receiver capabilities of this UE.

Figure 9:
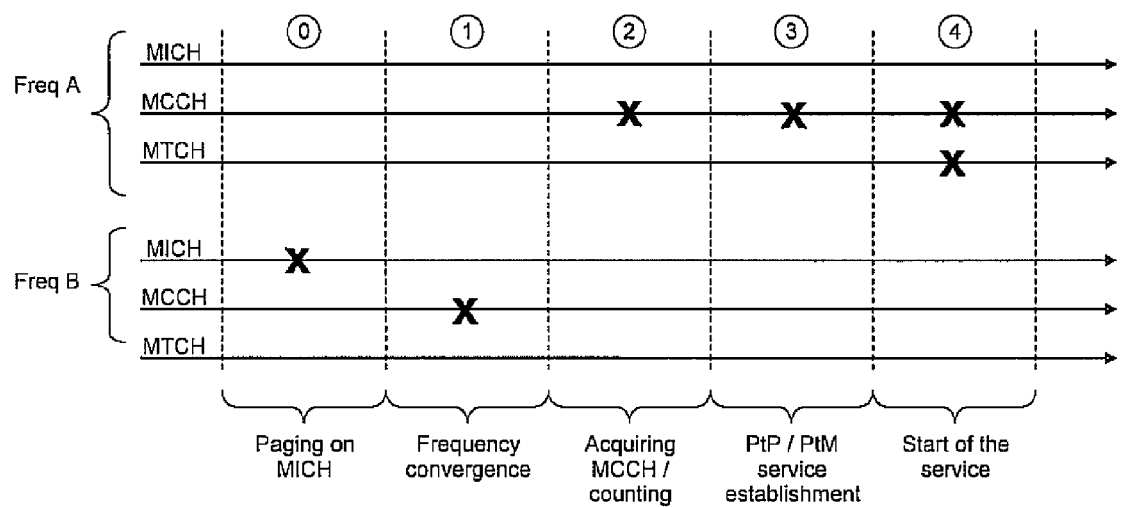
FIG. 9 illustrates operation of a dual receiver LE in accordance with an embodiment of the present invention.

Operation of a dual receiver UE in accordance with an embodiment of the present invention is illustrated in FIG. 9. A time period 0, the UE is shown camping on frequency B, and receiving the MICH. Upon detection of the MICH, the UE starts reading the MCCH on frequency B, and additionally receives frequency convergence information (time period 1). Since the UE may include a dual receiver, it can then activate the second receiver and start receiving the MCCH of frequency A (time period 2). The UE does not need to receive the MICH on frequency B, but the UE could optionally restart reception of the MICH or MCCH on frequency B, if so desired.

FIG. 9 depicts sending the service on the MTCH. Situations in which the MBMS service starts on the PtP bearer, the UE may perform frequency convergence in time periods 3 and 4 and request a PtP bearer.

In the case that a Rel-6 UE is performing frequency convergence, it will typically follow the Rel-6 inter frequency cell selection rules. Currently, there are not adequate solutions for how a dual receiver UE is to best receive the MBMS MTCH using its dual receiver capabilities. However, in accordance with an embodiment, a technique for accomplishing this is to have dual receiver UEs follow the inter frequency cell reselection rules and to read the BCCH on the frequency for MBMS reception.

Alternatively, the dual receiver UE could be configured to select cells that belong to the network to which it is registered, or to select cells that provide MBMS services that the UE has subscribed. To ensure that these requirements are fulfilled, the UE could use, for example, the preferred frequency list in cells in which it is camped on (if available), or the neighboring cell list. Other alternatives include the introduction of a MBMS specific neighboring cell or frequency list that includes cells or frequencies that a dual receiver UE is permitted to listen to.

In these scenarios, a dual receiver UE can receive the MBMS service it has subscribed. However in order to perform counting and the PtP request, the UE would typically still need to perform frequency convergence.

Figure 10:
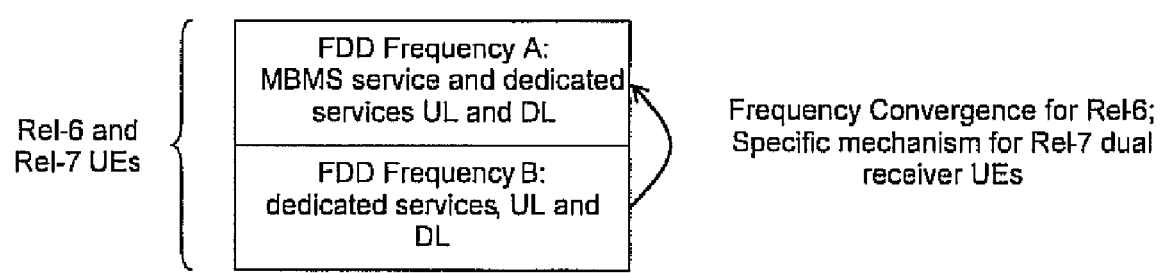
FIG. 10 illustrates a MBMS multicarrier network in Rel-6 with optimizations for Rel-7 dual receiver UEs.

To optimize control of dual receiver UEs, the MCCH may be arranged such that it would carry specific extensions that are only read by UEs with specific capabilities (e.g., a dual receiver, FDD and TDD receivers, and the like). An example of this is illustrated in FIG. 10. This would minimize or eliminate the drawbacks noted above such that the UE could respond to the counting/MBMS PtP establishment on a different frequency/cell as compared to the cell on which the UE is informed about the counting.

Figure 11:
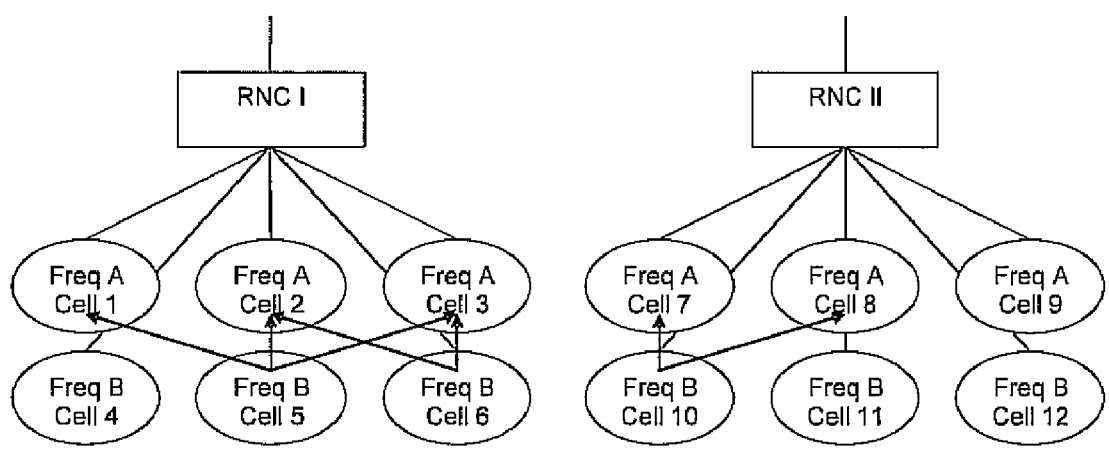
FIG. 11 illustrates cells from which the UE is allowed to act on the MCCH.

In order to indicate to the UE that this is allowed, information would typically be sent to the LE using, for example, either the BCCH or the MCCH. This could be implicit information, such as frequency convergence information in the MBMS general info message. That is, in the case that a neighboring frequency is indicated, the UE may then be allowed to respond to counting for any MCCH received in that given neighboring frequency. However, as shown FIG. 11, this could result in the UE camping in cell 6, for example, and responding to counting in cell 7. This would not be overly useful information since RNC II, not RNC I, controls cell 7. Therefore, it would be helpful to introduce an explicit indication.

For example, explicit indication may be sent on frequency B and could include in cell 5, for example, which cells from frequency A the counting responses/MBMS PtP bearer requests are allowed to be sent, or vice versa (i.e., for cells of frequency A, an indication from which cells from frequency B the counting responses can be sent).

This is because the RNC would only be able to interpret the counting responses/MBMS PtP bearer requests if the cell that the UE is camping on and the cell from which the UE reads the MCCH are controlled by the same RNC.

In the case that it is not indicated that the UE can respond on a counting/PtP establishment indicated in the MCCH of frequency A (on the cell on which the UE is camping), in frequency B the UE might still need to follow frequency convergence. However, this scenario is relative rare and it is possible that the UE is permitted to not follow counting and PtP establishment in that case.

To minimize the impact for counting a separate counting indicator, dual receiver UEs could be configured similarly to the way that this is currently done for idle/connected mode access probability factor and the counting scope. Thus, a dual receiver UE would send a response on a frequency different from the frequency on which the MCCH is sent in the case that this is indicated to be allowed, and in the case that the specific access probability factor/counting scope is included. This method allows performing the counting/PtP establishment on a different frequency on which the MTCH is sent (i.e., in the case that MBMS MTCH is sent on frequency A, counting/PtP establishment may be performed on frequency B for UEs with dual receiver capabilities, and counting/PtP establishment for Rel-6 UEs would be performed only on frequency A). If this mechanism is desired, then the UE may be configured to continue to read the MCCH on frequency B during the ongoing service in order to be able to respond to counting/PtP establishment.

To ensure that the RNC can link the counting response/PtP establishment request, it is useful that the dual receiver UE responds to messages received on a MCCH sent on a different cell as compared to the cell that the UE is camping. The response may include additional information in a message sent to the network such as, for example, the indication of the related services, the cell on which the MCCH has been received, the frequency on which the MCCH has been received, and the like.

A dual receiver UE for UMTS, for example, is typically capable to efficiently receive MBMS services and dedicated services in parallel. However, in Rel-6, the network usually does not have information on the limitations of the UE, or the extra freedom that the UE has in order to receive MBMS services. In the case that the UE is able to receive MTCH on a different frequency than the dedicated services, it is useful to inform the network of this capability (e.g., inform at RRC connection establishment or any other occasion).

An additional feature to facilitate dual receiver operation is to link the MBMS cell to the cell that the UE is camping on. This feature will be described with reference to FIG. 12. According to this feature, consider the situation in which the UE is camping on a cell that is at frequency B. In this case, an indication is given that identifies which cell or set of cells in frequency A is collocated with cells of frequency B. This therefore restricts the number of cells from which the UE has to choose for reception of MBMS services.

Figure 12:
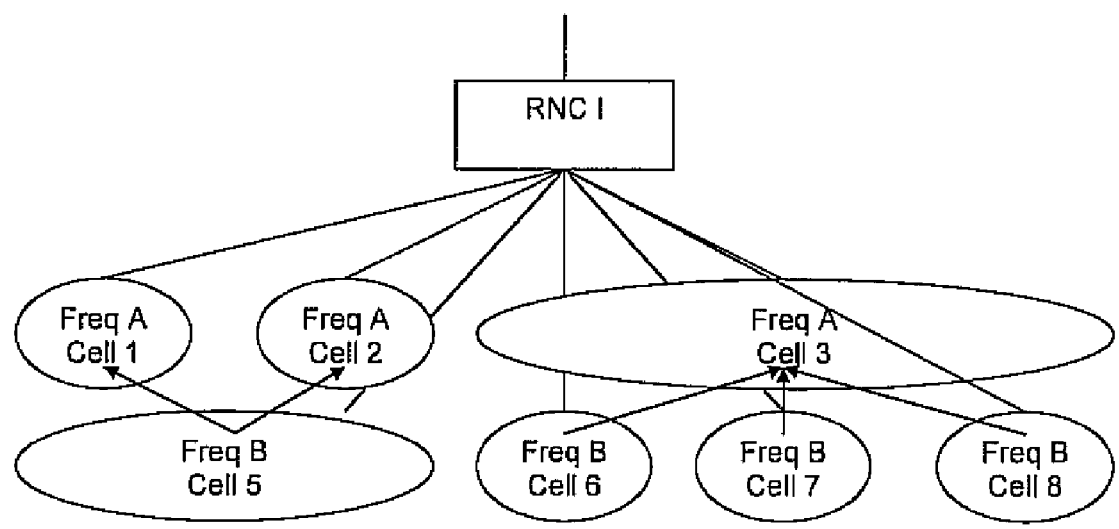
FIG. 12 illustrates cells from which the LE attempts to receive the MCCH/MTCH.
Figure 13:
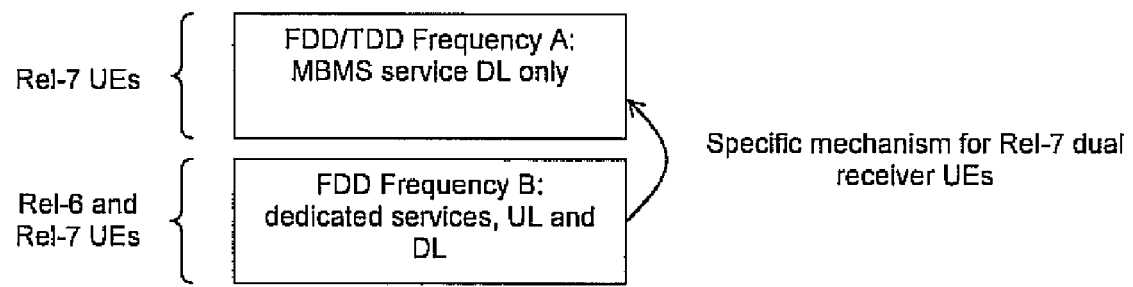
FIG. 13 illustrates a Rel-6 network (single carrier or multicarrier) with a separate independent MBMS downlink only frequency for dual receiver UEs (FDD/TDD)

In FIG. 12, if the UE camps on a cell 5, which is on frequency B, it would therefore be useful to point the UE to cells 1 and 2 since these cells have the same coverage. This reduces the complexity of the dual receiver UE and allows it to reduce the information on cell reselection that would need to be sent on the MBMS frequency. This is particularly useful in the case that the frequency is used as a MBMS only frequency.

In a further operation, it may be desirable that portions of the configuration (e.g., MCCH, MTCH, MSCH, radio bearer configuration of the cells and services in the frequency A, etc.), would be broadcast on frequency B such that a UE would only need to receive MTCH/MSCH on frequency A, but neither the BCCH nor the MCCH.

In these scenarios, a dual receiver UE is typically always able to receive the MBMS service to which it has subscribed without having any impact from MBMS services. This UE therefore does not have to follow frequency convergence, and thus there is no more impact for the UE for the case of simultaneous reception of dedicated and MBMS data.

As described above, a dual receiver UE typically is not required to transmit on frequency A, for example, which is the frequency on which the MBMS services are sent. However, due to backwards capability requirements which may be present, it is envisioned that a Rel-6 LU would camp on this frequency, and thus, it is possible that a UE might access the network. Therefore the network may therefore be equipped both a transmitter and receiver in these situations.

It has been established that there is a possibility that a dual receiver LE would camp on a different frequency than the frequency on which it receives MBMS services. This means that the UE would be able to respond to counting on the frequency that it is camping on, and not the frequency where the service is going to be broadcast. This permits the introduction of a frequency which would only be visible to Rel-7 UEs, and would typically be reserved for MBMS traffic. This allows for the use of a dedicated band for MBMS where only the downlink would be required. That is, there would be no need for receivers in these base stations. This also has the advantage that there is no impact on the ongoing dedicated services.

Downlink only MBMS carriers may be implemented at base stations which do not have receiver equipment. In order to prevent Rel-6 UEs from reselecting to downlink only MBMS service, it is useful that relevant SIBs, for example, are not sent on this carrier such that they are blocked for operator use, or any other technique which prevents Rel-6 and earlier UEs to select to this carrier. In addition, a specific indication may be implemented so that Rel-7 dual receivers UEs recognize cells in this frequency as cells which provide regular MBMS service.

To allow Rel-7 dual receiver MBMS UEs to select those carriers, it is useful to provide a specific indication in a Rel-7 extension on the BCCH or MCCH (e.g., a Rel-7 MBMS inter-frequency dual receiver cell info list). If desired, an inter-frequency FDD and/or TDD cells may also be added.

Various embodiments disclosed herein offer significant advantages for network operation. For instance, the operators need only deploy the necessary elements for MBMS, which therefore allows for cost reductions for the deployment of MBMS. Situations in which TDD is used, asymmetric spectrum for MBMS may also be deployed.

It is possible that UEs without dual receivers could receive MBMS services on a MBMS downlink only spectrum (e.g., by moving to the frequency as soon as the UE receives paging messages on the MBMS downlink only frequency or when the UE wants to initiate a call), there may be limitations in terms of counting, and PtP establishment.

Still further benefits include the allowing of counting and/or PtP establishment on a frequency which is different than the frequency at which the MTCH is received, indication of cells of similar coverage, use of configuration information of the MBMS channels in the neighboring cell, and indicating the dual receiver capability of the UE to the network.

Other benefits include provisions which prohibit or otherwise prevent Rel-6 UEs from attempting to camp on MBMS downlink only frequency, the indication that the MBMS service is broadcast on a hidden frequency, and the indication of the MBMS downlink only frequency in normal frequencies which are used for the dedicated service.

Figure 14:
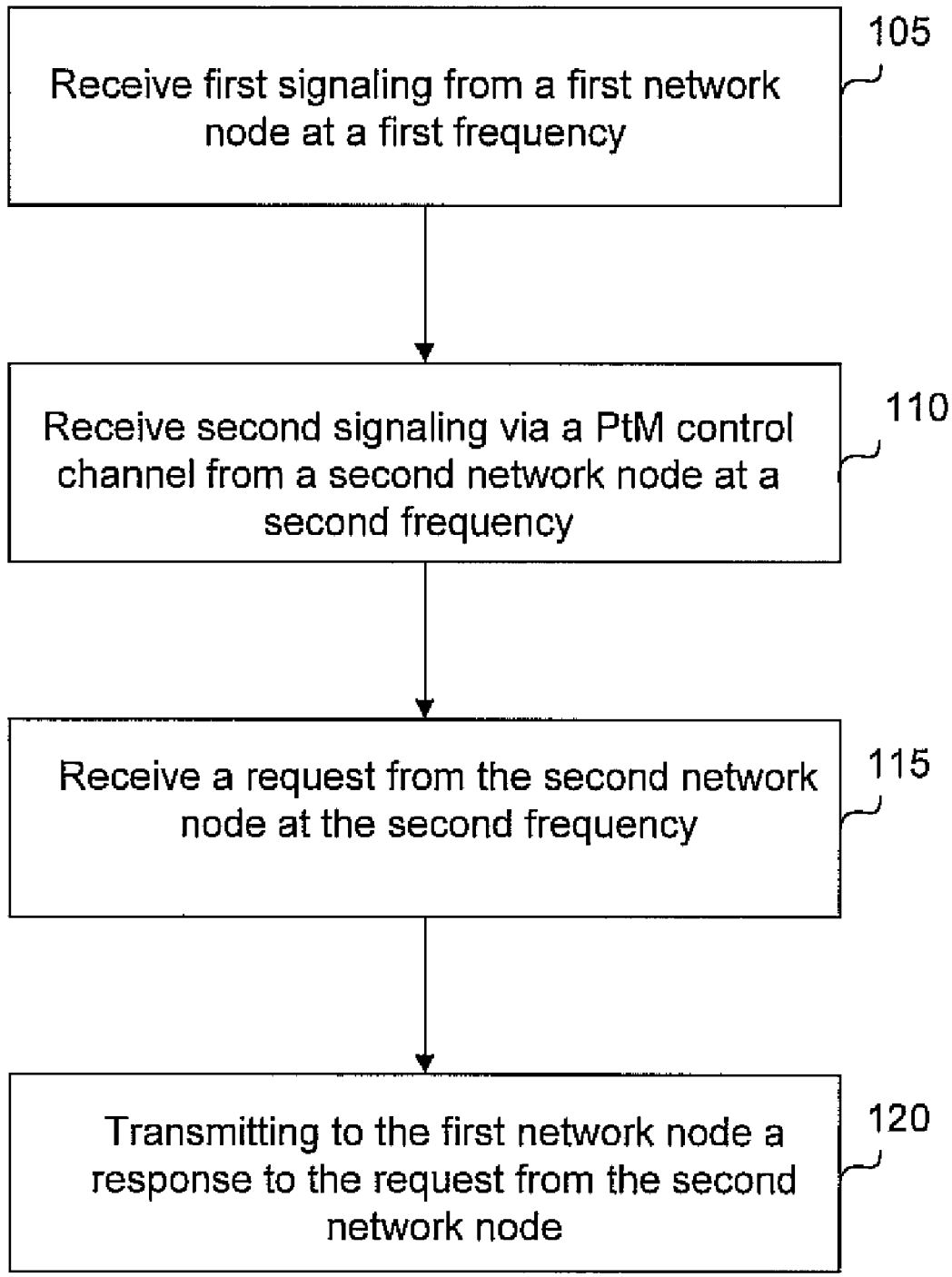
FIG. 14 is a flowchart depicting a method for communicating between a network and a dual receiver UE in accordance with an embodiment of the present invention.

FIG. 14 is a flowchart depicting a method for communicating between a network and a dual receiver UE in accordance with an embodiment of the present invention. Block 105 provides receiving first signaling from a first network node at a first frequency. In addition, at block 110, second signaling is received via a point-to-multipoint (PtM) control channel from a second network node at a second frequency. Block 115 provides receiving a request from the second network node at the second frequency, such that the request is carried on the PtM control channel. Another operation includes transmitting to the first network node a response to the request from said second network node (block 120).

Figure 15:
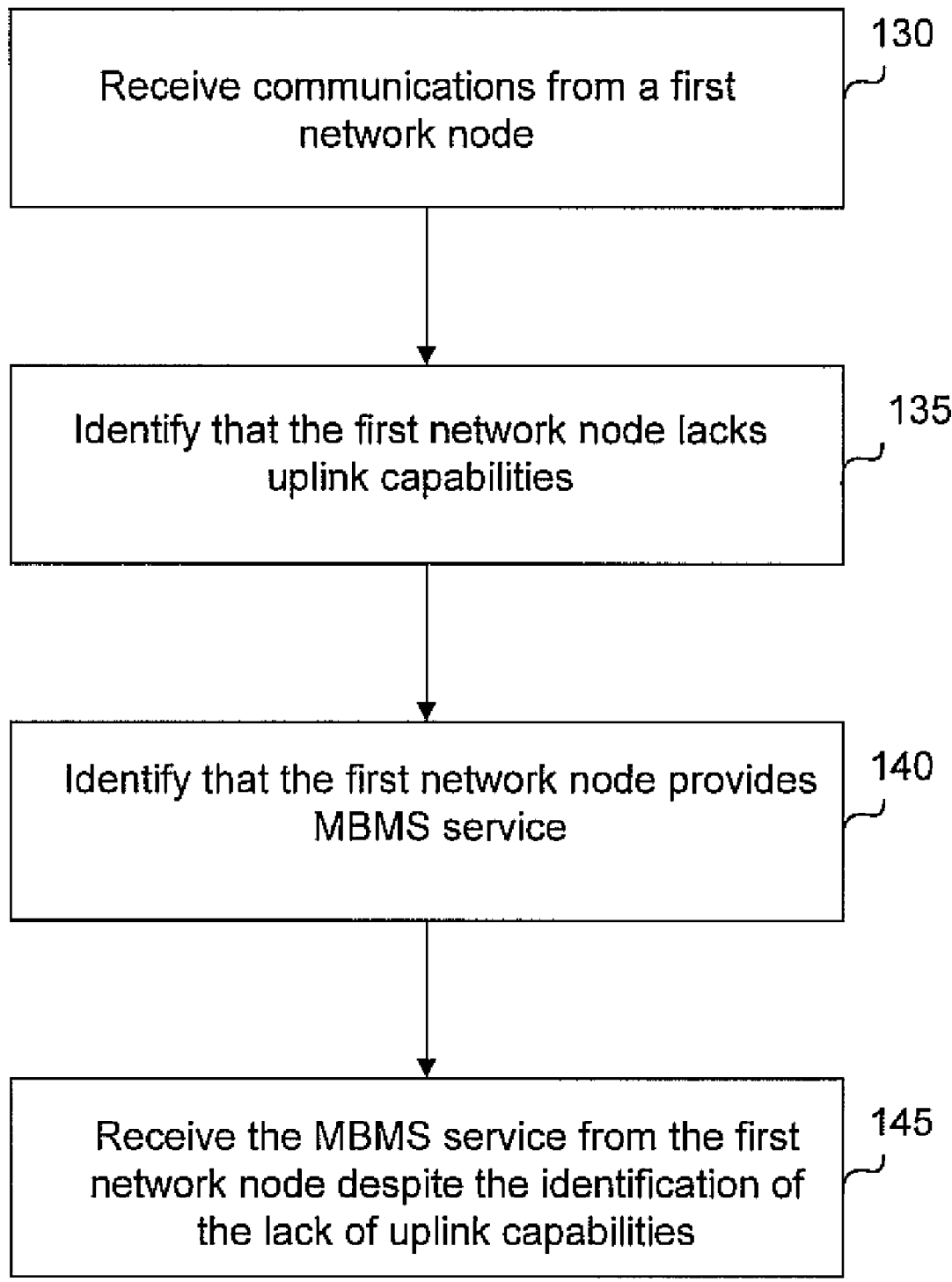
FIG. 15 is a flowchart depicting a method for communicating between a network and a dual receiver UE in accordance with an alternative embodiment of the present invention.

FIG. 15 is a flowchart depicting a method for communicating between a network and a dual receiver UE in accordance with an alternative embodiment of the present invention. Block 130 provides receiving communications from a first network node, and block 135 provides identifying that the first network node lacks uplink capabilities. One operation requires identifying that the first network node provides MBMS service (block 140). Another operation includes receiving the MBMS service from the first network node despite the identification of the lack of uplink capabilities (block 145).

Figure 16:
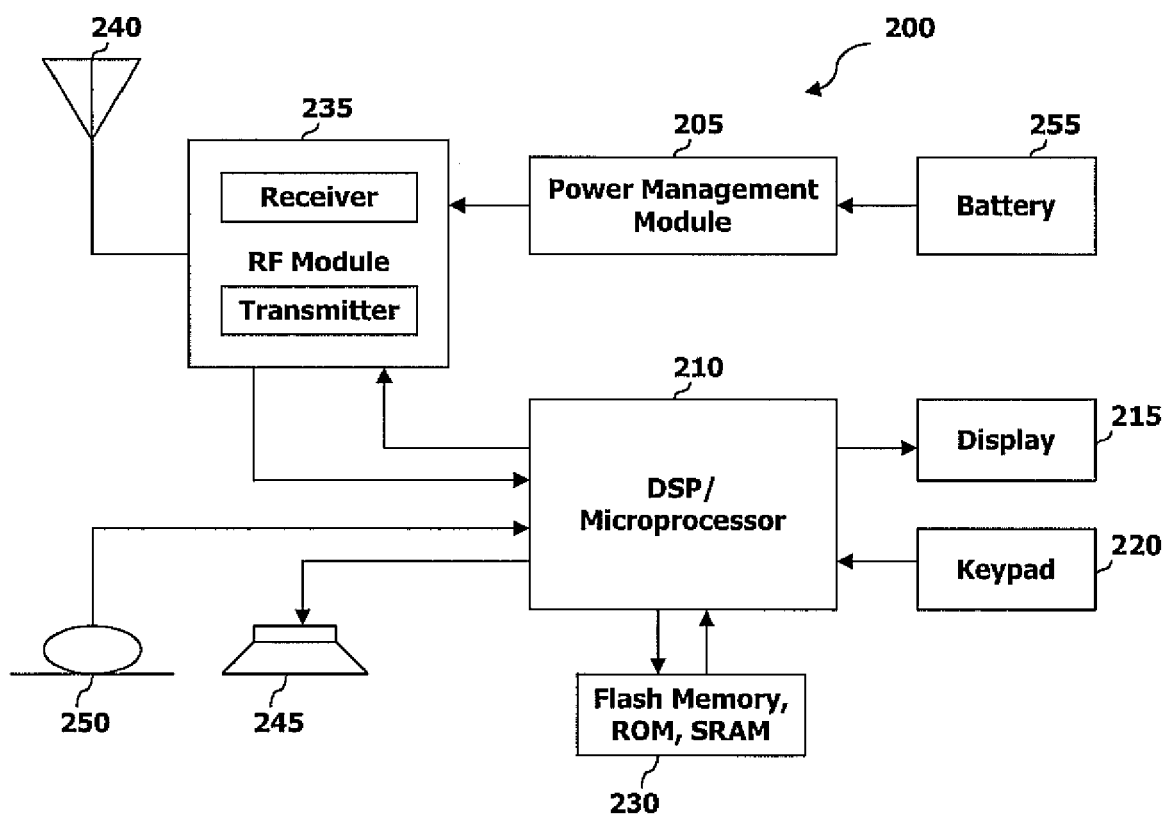
FIG. 16 illustrates a mobile communication terminal according to an embodiment of the present invention.

Referring to FIG. 16, a block diagram of a mobile communication terminal 200 of the present invention is illustrated, for example a mobile phone for performing the methods of the present invention. The mobile communication device 200 includes a processing unit 210 such as a microprocessor or digital signal processor, an RF module 235, a power management module 205, an antenna 240, a battery 255, a display 215, a keypad 220, a memory unit 230 such as flash memory, ROM or SRAM, a speaker 245 and a microphone 250.

A user enters instructional information, such as a telephone number, for example, by pushing the buttons of a keypad 220 or by voice activation using the microphone 250. The processing unit 210 receives and processes the instructional information to perform the appropriate function, such as to dial the telephone number. Operational data may be retrieved from the memory unit 230 to perform the function. Furthermore, the processing unit 210 may display the instructional and operational information on the display 115 for the user's reference and convenience.

The processing unit 210 issues instructional information to the RF section 235, to initiate communication, for example, transmit radio signals comprising voice communication data. The RF section 235 comprises a receiver and a transmitter to receive and transmit radio signals. The antenna 240 facilitates the transmission and reception of radio signals. Upon receiving radio signals, the RF module 235 may forward and convert the signals to baseband frequency for processing by the processing unit 210. The processed signals would be transformed into audible or readable information outputted via the speaker 245, for example.

The processing unit 210 is adapted to perform the methods disclosed herein, among other operation. It will be apparent to one skilled in the art that the mobile communication device 200 may be readily implemented using, for example, the processing unit 210 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, and the like.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for communicating between a network and a dual receiver user equipment (UE), said method comprising:
receiving first signaling from a first network node at a first frequency;
receiving second signaling via a point-to-multipoint (PtM) control channel from a second network node at a second frequency, substantially simultaneously with receiving said first signaling from said first network node at said first frequency;

receiving a request from said second network node at said second frequency, wherein said request is carried on said PtM control channel; and transmitting to said first network node a response to said request from said second network node;

receiving transmission permission from either of said second network node or said first network node, wherein said transmission permission causes said transmitting of said response to said first network node; and receiving a frequency conversion message from said first network node, wherein said message allows said UE to attempt to reselect a third network node transmitting on said second frequency, wherein said transmission permission causes said UE to disregard said message such that said UE does not perform said attempt to reselect, wherein said response is not transmitted to said second network node, and wherein said first network node and said second network node are separately implemented in distinct base stations.

2. The method according to claim 1, further comprising:
receiving a list of at least one different network node which transmits at said second frequency and which provides cell coverage which overlaps at least a portion of cell coverage provided by said first network node.

3. The method according to claim 1, further comprising:
receiving at least one identity from said first network node, wherein said at least one identity identifies said second network node.

4. The method according to claim 1, wherein said transmission permission is received from said second network node and comprises a list of network nodes to which said response can be transmitted.

5. The method according to claim 1, wherein said transmission permission is received from said first network node and comprises a list of network nodes from which said request has been received.

6. The method according to claim 1, wherein said response comprises at least one of a service identifier which identifies a service associated with said user equipment (UE), a frequency identifier which identifies said second frequency, and a cell identifier which identifies said second network node.

7. The method according to claim 1, wherein said response comprises one of an RRC connection request and a cell update.

8. The method according to claim 1, wherein said response comprises a multimedia broadcast/multicast service (MBMS) modification request.

9. The method according to claim 1, wherein said request comprises a counting request.

10. The method according to claim 1, wherein said request comprises a point-to-point establishment request.

11. The method according to claim 1, wherein said point-to-multipoint (PtM) control channel comprises a multimedia broadcast/multicast service (MBMS) point-to-multipoint control channel.

12. A method for communicating between a network and a dual receiver user equipment (UE), said method comprising:
communicating first signaling from a first network node at a first frequency;

communicating second signaling via a point-to-multipoint (PtM) control channel from a second network node at a second frequency, substantially simultaneously with communicating said first signaling from said first network node at said first frequency;

communicating a request from said second network node at said second frequency, wherein said request is carried on said PtM control channel;

receiving at said first network node a response to said request from said second network node;

communicating transmission permission from either of said second network node or said first network node, wherein said transmission permission causes transmitting of said response to said first network node; and communicating a frequency conversion message from said first network node, wherein said message allows said UE to attempt to reselect a third network node transmitting on said second frequency, wherein said transmission permission causes said UE to disregard said message such that said UE does not perform said attempt to reselect, wherein said response is not received at said second network node, and wherein said first network node and said second network node are separately implemented in distinct base stations.

13. The method according to claim 12, further comprising:
communicating a list of at least one different network node which transmits at said second frequency and which provides cell coverage which overlaps at least a portion of cell coverage provided by said first network node.

14. The method according to claim 12, further comprising:
communicating at least one identity from said first network node, wherein said at least one identity identifies said second network node.

15. The method according to claim 12, wherein said transmission permission is communicated from said second network node and comprises a list of network nodes to which said response can be transmitted.

16. The method according to claim 12, wherein said transmission permission is communicated from said first network node and comprises a list of network nodes from which said request has been received.

17. The method according to claim 12, wherein said response comprises at least one of a service identifier which identifies a service associated with said user equipment (UE), a frequency identifier which identifies said second frequency, and a cell identifier which identifies said second network node.

18. The method according to claim 12, wherein said response comprises one of an RRC connection request and a cell update.

19. The method according to claim 12, wherein said response comprises a multimedia broadcast/multicast service (MBMS) modification request.

20. The method according to claim 12, wherein said request comprises a counting request.

21. The method according to claim 12, wherein said request comprises a point-to-point establishment request.

22. The method according to claim 12, wherein said point-to-multipoint (PtM) control channel comprises a multimedia broadcast/multicast service (MBMS) point-to-multipoint control channel.

* * * * *